US009488201B2

(12) United States Patent
Sumners

(10) Patent No.: US 9,488,201 B2
(45) Date of Patent: Nov. 8, 2016

(54) TUCKED CUSHION CLAMP AND PROCESS OF MAKING A TUCKED CUSHION CLAMP

(71) Applicant: AdelWiggins Group, Los Angeles, CA (US)

(72) Inventor: Bob Sumners, Corona, CA (US)

(73) Assignee: Adel Wiggins Group, a Division of TransDigm Inc., Los Angeles, CA (US)

( * ) Notice: Subject to any disclaimer, the term of this patent is extended or adjusted under 35 U.S.C. 154(b) by 0 days.

(21) Appl. No.: 14/875,040

(22) Filed: Oct. 5, 2015

(65) Prior Publication Data
US 2016/0097413 A1 Apr. 7, 2016

Related U.S. Application Data

(60) Provisional application No. 62/059,267, filed on Oct. 3, 2014.

(51) Int. Cl.
*F16L 3/12* (2006.01)
*F16B 2/22* (2006.01)
*B23P 11/00* (2006.01)
*B23P 19/04* (2006.01)
*D04B 1/22* (2006.01)
*F16B 2/08* (2006.01)
*F16L 59/135* (2006.01)
*F16L 55/035* (2006.01)
*F16L 57/06* (2006.01)
*F16L 59/12* (2006.01)

(52) U.S. Cl.
CPC ............... *F16B 2/22* (2013.01); *B23P 11/005* (2013.01); *B23P 19/04* (2013.01); *D04B 1/225* (2013.01); *F16B 2/08* (2013.01); *F16L 55/035* (2013.01); *F16L 59/135* (2013.01); *F16L 57/06* (2013.01); *F16L 59/12* (2013.01)

(58) Field of Classification Search
CPC ............ F16L 3/12; F16L 3/1233; H02G 3/32
See application file for complete search history.

(56) References Cited

U.S. PATENT DOCUMENTS

| 2,338,659 | A | * | 1/1944 | Morehouse | F16L 3/1233 174/40 CC |
| 2,387,295 | A | * | 10/1945 | Robertson | F16L 3/1233 174/40 CC |
| 2,396,837 | A | * | 3/1946 | Ellinwood | F16L 3/1008 174/40 CC |
| 2,404,473 | A | * | 7/1946 | Chunn | F16L 3/12 248/74.3 |
| 2,709,558 | A | * | 5/1955 | Young | F16L 55/035 174/40 CC |

(Continued)

OTHER PUBLICATIONS

International Search Report, Dec. 22, 2015, 2 pages, from PCT/US15/053940, published as WO 2016/054622 on Apr. 7, 2016.

*Primary Examiner* — Bradley Duckworth
(74) *Attorney, Agent, or Firm* — Fulwider Patton LLP

(57) ABSTRACT

A process of forming a cushioned clamp in accordance with aspects of the present disclosure includes configuring a single-ply of woven fiberglass into a longitudinal tube to form a single-ply fiberglass sleeving, coating the single-ply fiberglass sleeving with an aluminum paint, subjecting the coated single-ply fiberglass sleeving to a warming medium, while pliable due to the warming medium, cutting the sleeving into discreet, individual pieces configured for forming a sleeve, folding a first cut end in on itself and pulling the first cut end toward a center of the sleeve to form a first rolled end, and folding a second cut end in on itself and pulling the second cut end toward a center of the sleeve to form a second rolled end, and slidably mounting the sleeve onto a bare metal clamp to form the cushioned clamp.

19 Claims, 5 Drawing Sheets

(56) References Cited

U.S. PATENT DOCUMENTS

| | | | | |
|---|---|---|---|---|
| 2,923,760 A * | 2/1960 | Famely | F16L 3/1233 | 174/40 CC |
| 2,936,982 A * | 5/1960 | Cushenberry | F16L 3/1233 | 174/40 CC |
| 3,041,025 A * | 6/1962 | Daly | F16L 3/1233 | 248/74.3 |
| 3,196,535 A | 7/1965 | Crawford et al. | | |
| 3,302,915 A * | 2/1967 | Usher | F16L 3/123 | 248/74.3 |
| 3,856,245 A * | 12/1974 | Byerly | F16L 55/035 | 248/74.3 |
| 4,395,619 A * | 7/1983 | Harigai | A45D 20/12 | 219/536 |
| 4,441,677 A * | 4/1984 | Byerly | F16L 3/1233 | 24/16 PB |
| 4,643,229 A | 2/1987 | Hickin | | |
| 5,220,710 A * | 6/1993 | Laudan | F16L 3/12 | 24/20 LS |
| 5,377,940 A * | 1/1995 | Cabe | F16L 3/1233 | 248/68.1 |
| 5,384,936 A * | 1/1995 | Van Walraven | F16L 3/12 | 24/279 |
| 6,508,442 B1 * | 1/2003 | Dolez | F16L 3/1233 | 248/230.9 |
| 6,732,982 B1 * | 5/2004 | Messinger | F16L 3/1233 | 24/16 PB |
| 7,190,892 B2 * | 3/2007 | Kertesz | H05B 3/58 | 392/465 |
| 8,038,104 B1 * | 10/2011 | Larkin | F16L 55/035 | 248/55 |
| 8,235,332 B2 * | 8/2012 | Cesarino | B60R 16/0215 | 248/65 |
| 2008/0001396 A1 * | 1/2008 | Nish | F16L 17/04 | 285/53 |
| 2011/0204192 A1 * | 8/2011 | Geppert | F16L 3/1233 | 248/74.1 |
| 2012/0112016 A1 * | 5/2012 | Blanchard | H02G 3/32 | 248/74.2 |
| 2013/0313375 A1 * | 11/2013 | Dworak, Jr. | F16L 3/1075 | 248/74.2 |

\* cited by examiner

TUCKED CUSHION CLAMP AND PROCESS OF MAKING A TUCKED CUSHION CLAMP

CROSS REFERENCE TO PRIOR APPLICATIONS

This application claims the benefit from U.S. Provisional Application No. 62/059,267 filed on Oct. 3, 2014, which is hereby incorporated by reference for all purposes as if fully set forth herein.

FIELD OF THE DISCLOSURE

The disclosure relates generally to retaining mechanisms. More particularly, the disclosure relates to cushioned clamping mechanisms and a process of constructing cushioned clamping mechanisms.

BACKGROUND OF THE DISCLOSURE

There are many clamping devices that exist for retaining wires and the like for many different applications. They include cushioned and uncushioned loop clamps, hose clamps, snapper type clamps, and others. The loop clamp is common in aircraft and automotive industries, for both original equipment manufacturing as well as aftermarket sectors. These clamps are often used to attach pods, splitters, various wire harnesses, wire assemblies and the like to an airframe, for example.

Cushioned clamps are often used to dampen vibration, reduce noise, and reduce wear on the features supported by the clamps. In environments where high-temperature sustainability is a concern, fiberglass sleeves are often used as the cushioning element for cushioned clamps. However, conventional fiberglass sleeves used on cushioned clamps may be susceptible to fraying or separation, which can result in the clamp used to carry a wire conduit, for example, becoming a source of wear on a wire. An electrical short could result if the bare metal clamp contacts the conducting element of a wire, which depending on the wire could have potentially dangerous consequences.

Accordingly, there exists a need for improved cushioned clamps and a process for the manufacturing and assembly of cushioned clamps with fiberglass sleeves.

SUMMARY OF THE DISCLOSURE

Aspects of the disclosure advantageously provide a cushioned clamping apparatus and process of manufacture thereof.

According to one aspect a process of forming a cushioned clamp includes configuring a single-ply of woven material into a longitudinal tube to form a single-ply woven material sleeving, folding a first cut end in on itself and pulling the first cut end toward a center of the sleeve to form a first rolled end, folding a second cut end in on itself and pulling the second cut end toward the center of the sleeve to form a second rolled end, and slidably mounting the sleeve onto a loop centered section to form the cushioned clamp.

According to another aspect a cushioned clamp includes a single-ply of woven material arranged in a longitudinal tube to form a single-ply woven material sleeve, the single-ply woven material sleeve comprising a first cut end folded in on itself extending toward a center of the single-ply woven material sleeve to form a first rolled end, the single-ply woven material sleeve comprising a second cut end folded in on itself extending toward the center of the single-ply woven material sleeve to form a second rolled end, and a looped center section configured to receive the single-ply woven material sleeve, where the looped center section is configured to support a supported feature.

According to another aspect a process of forming a cushioned clamp includes configuring a single-ply of woven material into a longitudinal tube to form a single-ply woven material sleeving, coating the single-ply woven material sleeving with a paint, subjecting the coated single-ply fiberglass sleeving to a warming medium, cutting the single-ply woven material sleeving into discreet, individual pieces configured for forming a sleeve while pliable due to the warming medium, folding a first cut end in on itself and pulling the first cut end toward a center of the sleeve to form a first rolled end, folding a second cut end in on itself and pulling the second cut end toward the center of the sleeve to form a second rolled end, and slidably mounting the sleeve onto a loop center section to form the cushioned clamp, where the cushioned clamp comprises a looped center section, a foot section having an aperture for receiving a mechanical fastener, and a tail section having an aperture for receiving the mechanical fastener.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, process and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

FIGS. 7, 7A and 7B illustrate various aspects of a completed cushioned sleeve assembly prepared in accordance with aspects of the present disclosure.

DETAILED DESCRIPTION

Figure 1:
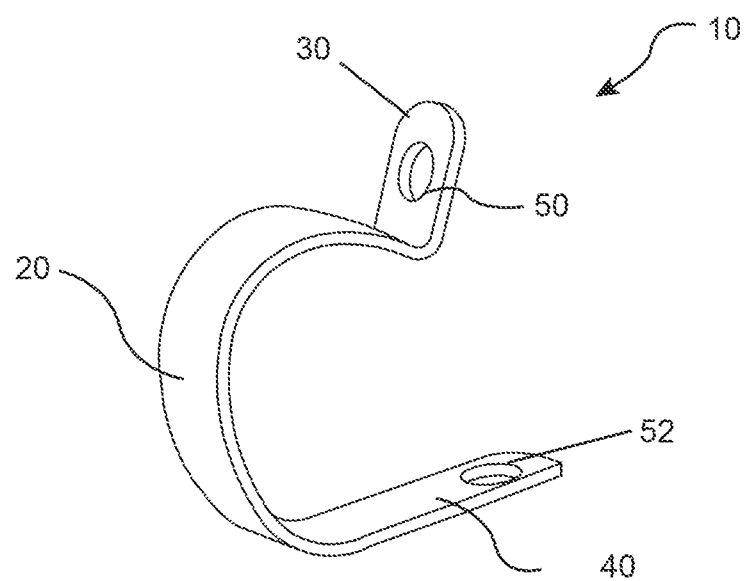
FIG. 1 presents a perspective view of a metal clamp, in accordance with aspects of the present disclosure.

The disclosure will now be described with reference to the drawing figures, in which like reference numerals refer to like parts throughout.

Various aspects of a tucked material cushion clamp may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled," "directly attached," and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of a tucked material cushion clamp in addition to the orientation depicted in the drawings. By way of example, if aspects of a tucked material cushion clamp shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

Various aspects of a tucked material cushion clamp may be illustrated with reference to one or more exemplary aspects. As used herein, the term "exemplary" means "serving as an example, instance, or illustration," and should not necessarily be construed as preferred or advantageous over other aspects of a tucked material cushion clamp disclosed herein.

FIG. 1 presents a perspective view of a metal clamp, in accordance with aspects of the present disclosure. In particular, FIG. 1 illustrates a bare metal loop clamp 10. Although described herein with respect to a loop clamp, the process and devices disclosed herein apply equally to all shapes and forms of retention clamps as one of skill in the art would readily recognize. The bare metal loop clamp 10 typically has a looped center section 20 separating a bent foot section 30 at one free end and a tail section 40 at the other free end. The bare metal loop clamp 10 is typically installed by placing the looped center section 20 around a feature to be supported and compressing the bent foot section 30 toward the tail section 40 until the fastening holes 50 and 52 align. Any suitable securing means, such as a bolt, screw, rivet, or other type of mechanical fastener for example, may then be driven or placed through the fastening holes 50 and 52 and secured to a structure in a manner that clamps the foot section 30 to the tail section 40 such that the looped center section 20 forms an enclosed supporting structure around the supported feature.

Figure 2:
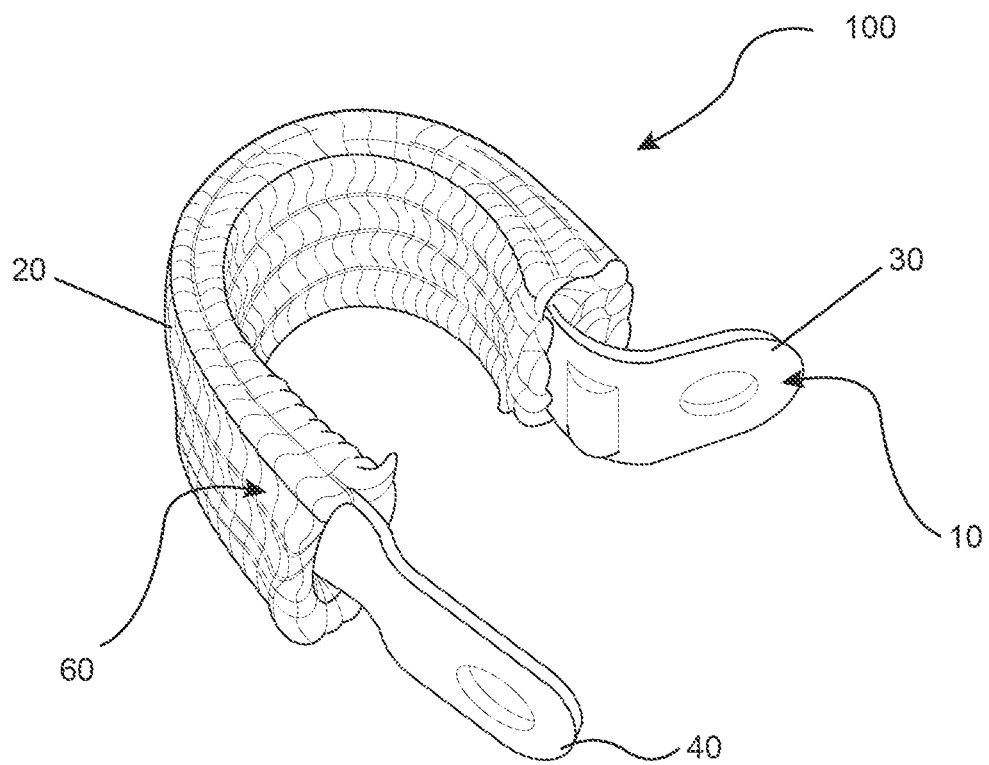
FIG. 2 presents a perspective view of the metal clamp of FIG. 1 with a cushioning sleeve, in accordance with aspects of the present disclosure.

Cushioned clamps are often used to dampen vibration, reduce noise, reduce wear, and/or the like on the supported features. A cushioned clamp assembly 100 in accordance with aspects of the disclosure is shown in FIG. 2. The same bare metal loop clamp 10 illustrated in FIG. 1 is configured with a cushioning element 60 that may cover a portion or substantially all of the looped center section 20 of the clamp. As illustrated in FIG. 2, the cushioning element 60 may be a sleeve that includes a suitable material. The suitable material may include a woven material. The woven material may be a fiberglass yarn weave, a plastic compound, or a rubber compound. For example, a suitable material that fits over or encompasses a substantial portion of the looped center section 20. Fiberglass sleeves may be desirable in environments where high-temperature sustainability is a concern. In particular, fiberglass sleeves are often a desired solution as the cushioning element 60 for clamps used in aircraft applications, where the clamps are required by regulation to sustain temperatures up to 1000° Fahrenheit without failing. In a particular aspect, the fiberglass sleeves may be Adel 1130 fiberglass sleeves. However, other types of woven materials are contemplated as well. Moreover, other non-woven materials are furthermore contemplated. Nevertheless, for brevity and simplification of the description, the disclosure will reference a fiberglass woven material.

The fiberglass sleeve used as the cushioning element may begin the manufacturing process as a long, two-ply tubular sleeve having a first, outer fiberglass sleeve layer concentrically arranged around a second, inner fiberglass sleeve layer. During the manufacturing and/or assembly process, the two-ply tubular sleeve may be cut into shorter, applicable lengths for sliding onto the looped center section 20 of the bare metal loop clamp 10. The cutting process often leaves the ends of the two-ply sleeve with frayed ends such that a sealant must be applied to seal the ends of the two-ply sleeve to prevent further fraying and failure of the sleeve. Many conventional sealants burn off when the temperature range gets into the mid-400° F. range. High-temperature sealants capable of withstanding up to 1000° F. temperatures often become inflexible when cured and are subject to cracking and/or falling off. When that happens, the unprotected ends of the two-ply tubular sleeve may begin to fray and/or become susceptible to foreign object debris.

Another issue with the two-ply tubular sleeve may result from a particular process of manufacture. The cushioned clamp may be formed by providing a flat template metal piece and sliding the sleeve on first, prior to rolling the flat template metal piece into a final configuration. When rolling the clamp into the final configuration, such as the looped configuration illustrated in FIG. 2, the induced curvature causes misalignment of the ends as one end or portion of an end of one of the layers is pulled away from the previously aligned portion of the other one of the layers due to the differing radius of curvature imparted with respect to the radially facing interior of each tubular layer in comparison to the radially facing exterior of each tubular layer.

Figures 3, 4:
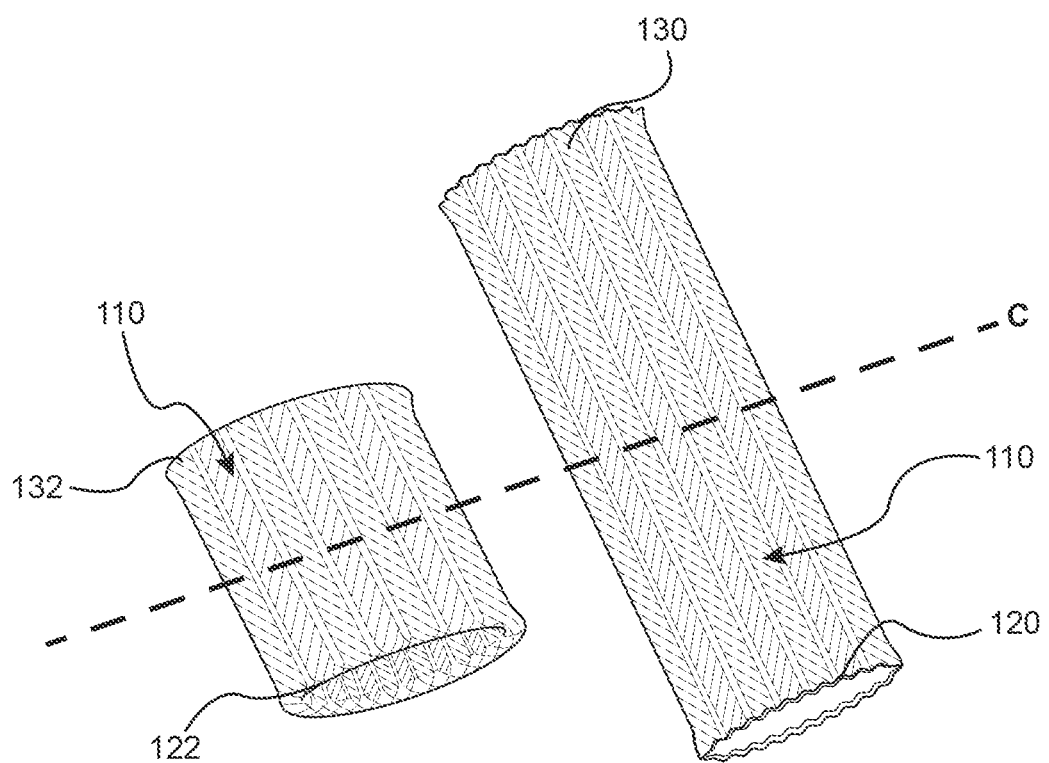
FIG. 3 illustrates a discrete, processed sleeve in a final two-ply configuration ready for installation onto a bare metal clamp, in accordance with aspects of the present disclosure.
FIG. 4 shows the sleeve in a preliminary one-ply configuration prior to being formed into the final configuration shown in FIG. 3, in accordance with aspects of the present disclosure.

To solve the problems discussed above, FIGS. 3 and 4 illustrate a sleeving concept in accordance with aspects of the disclosure. FIG. 3 shows a discrete, processed sleeve 110 in a final two-ply configuration ready for installation onto a bare metal clamp 10. FIG. 4 shows the sleeve 110 in a preliminary one-ply configuration prior to being formed into the final configuration shown in FIG. 3. To form the sleeve 110, a single-ply of a woven fiberglass yarn may be first configured into a longitudinal tube. In accordance with yet other aspects of the present disclosure, if the stock fiberglass sleeving is the two-ply fiberglass sleeving discussed above, the inner and outer sleeves of the stock sleeving may be separated into two units of single-ply sleeving. The extremely flexible, single-ply fiberglass sleeving may then be dipped into and/or coated with paint. For example, the sleeving may then be dipped into and/or coated with an aluminum paint and allowed to dry. For delivery to the next processing step, the aluminum-coated sleeving may be configured onto a continuous roll and/or into discrete longitudinal lengths.

Once coated, the sleeving may be more abrasion resistant but also loses a substantial amount of its flexibility. Therefore, to enable processing into the smaller sections needed to form the discrete sleeves 110, the coated fiberglass sleeving requires softening prior to being cut into discrete lengths. In accordance with certain aspects of the present disclosure, a portion of the coated fiberglass sleeving is subjected to a warming medium, preferably an inert liquid medium that will not react with the aluminum coating and/or the encapsulated fiberglass weave. For example, the coated fiberglass sleeving may be dipped in a bath of water heated to a predetermined temperature, such as approximately 100° F., and soaked for a predetermined amount of time, such as approximately 5 minutes, or any appropriate combination of temperature and time that causes the coated fiberglass sleeving to attain a requisite pliability. Other types of heating medium are contemplated as well including ovens, heat guns, and the like. With the coated sleeving in a pliable state, the sleeving may be cut into discreet, individual pieces of appropriate size for forming the sleeve 110 shown in FIG. 4. As shown in FIG. 4, the length of the sleeve 110 when initially cut and in a single-ply configuration should be approximately two times the length of the sleeve 110 shown in the final configuration of FIG. 3. However, other relative lengths are contemplated as well.

Figure 5:
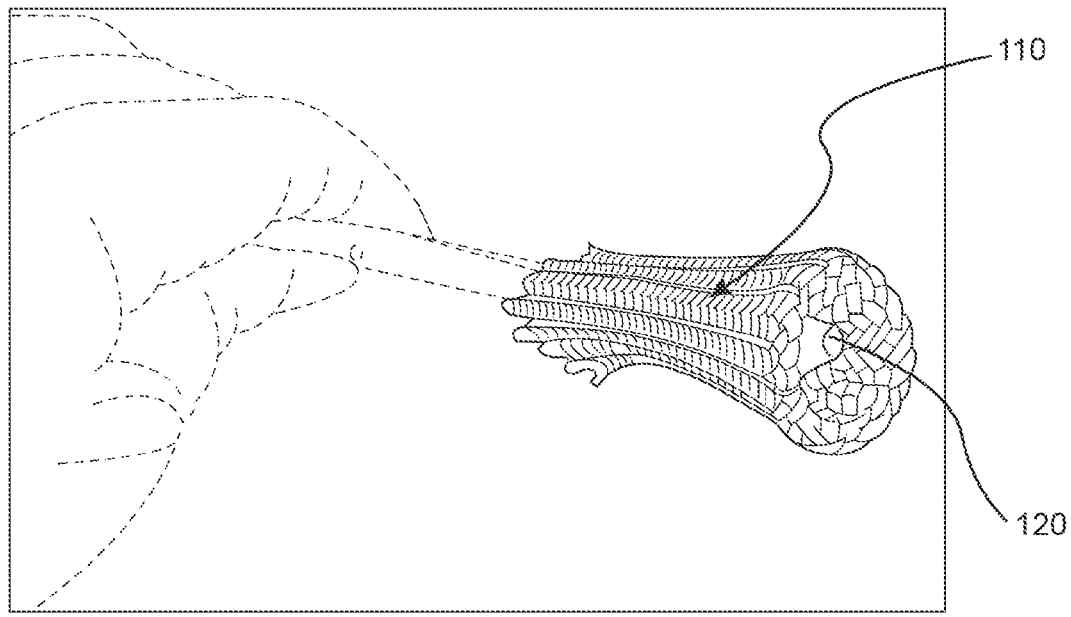
FIG. 5 illustrates aspects of a process of forming a sleeve for a cushioned clamp, in accordance with aspects of the present disclosure.
Figure 6:
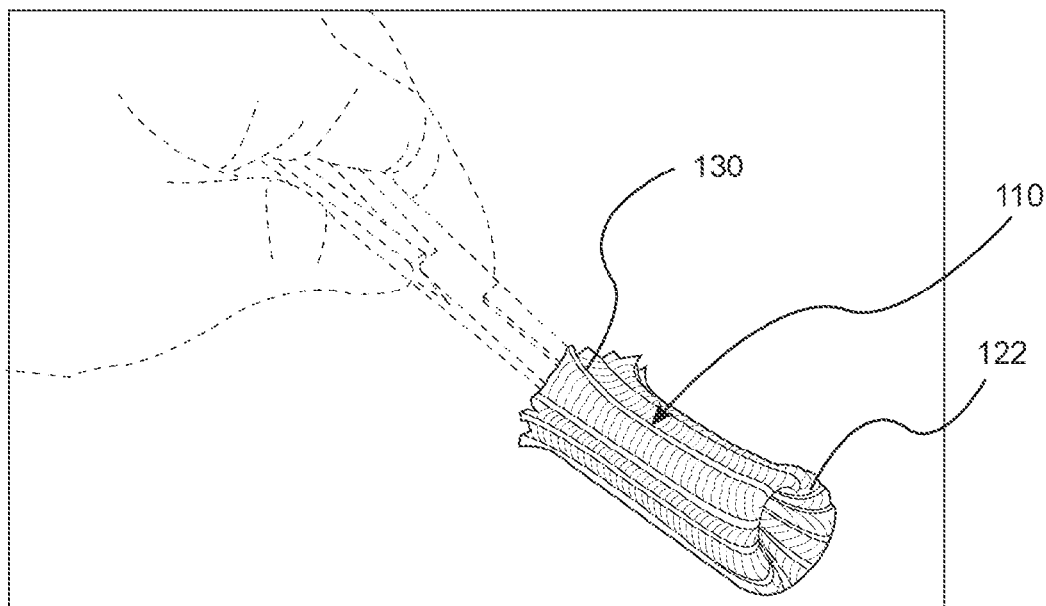
FIG. 6 illustrates aspects of a process of forming a sleeve for a cushioned clamp, in accordance with aspects of the present disclosure.

As shown in FIG. 4, the one-ply initial configuration of the discreet sleeve 110 has a first cut end 120 and a second cut end 130. While still in a pliable state, as shown in FIG. 5, the first cut end 120 may be folded in on itself and pulled toward the center of the sleeve 110 until, as shown in FIG. 6, the first cut end 120 is pulled inside and positioned at or near a center point C of the sleeve 110 shown in FIG. 4, forming a first rolled end 122 (see also FIG. 3). The same process is repeated with the second cut end 130 so that the second cut end 130 meets the first cut end 120 internally at approximately the center point C of the sleeve 110 and a second rolled end 132 may be formed. By using a single layer of coated fiberglass sleeving and folding it in on itself as provided herein, the thickness of the discreet cushion sleeve 110 is brought back to a required thickness while eliminating the chance of fraying because the cut ends 120 and 130 are now located toward the center of the inside portion of the sleeve 110. The cushioned sleeve 110 may be flattened, for example, as shown in FIG. 3, in order to more easily accommodate the bare metal loop clamp 10 therein and the sleeve 110 may be slidably mounted onto the bare metal loop clamp 10 to form the cushioned clamp assembly 100 illustrated in FIG. 2.

In accordance with yet another aspect of the present disclosure, the complete cushioned clamp assembly 100 may then be dried. For example, the cushioned clamp assembly 100 may be placed in a curing oven at a temperature of approximately 250° for 30 minutes to evaporate out any residual water retained by the aluminum-coated fiberglass sleeving material. Any combination of temperatures, from a few degrees above ambient to close to 1000° F., may be used in combination with a predetermined corresponding time to complete the drying process.

Figure 7:
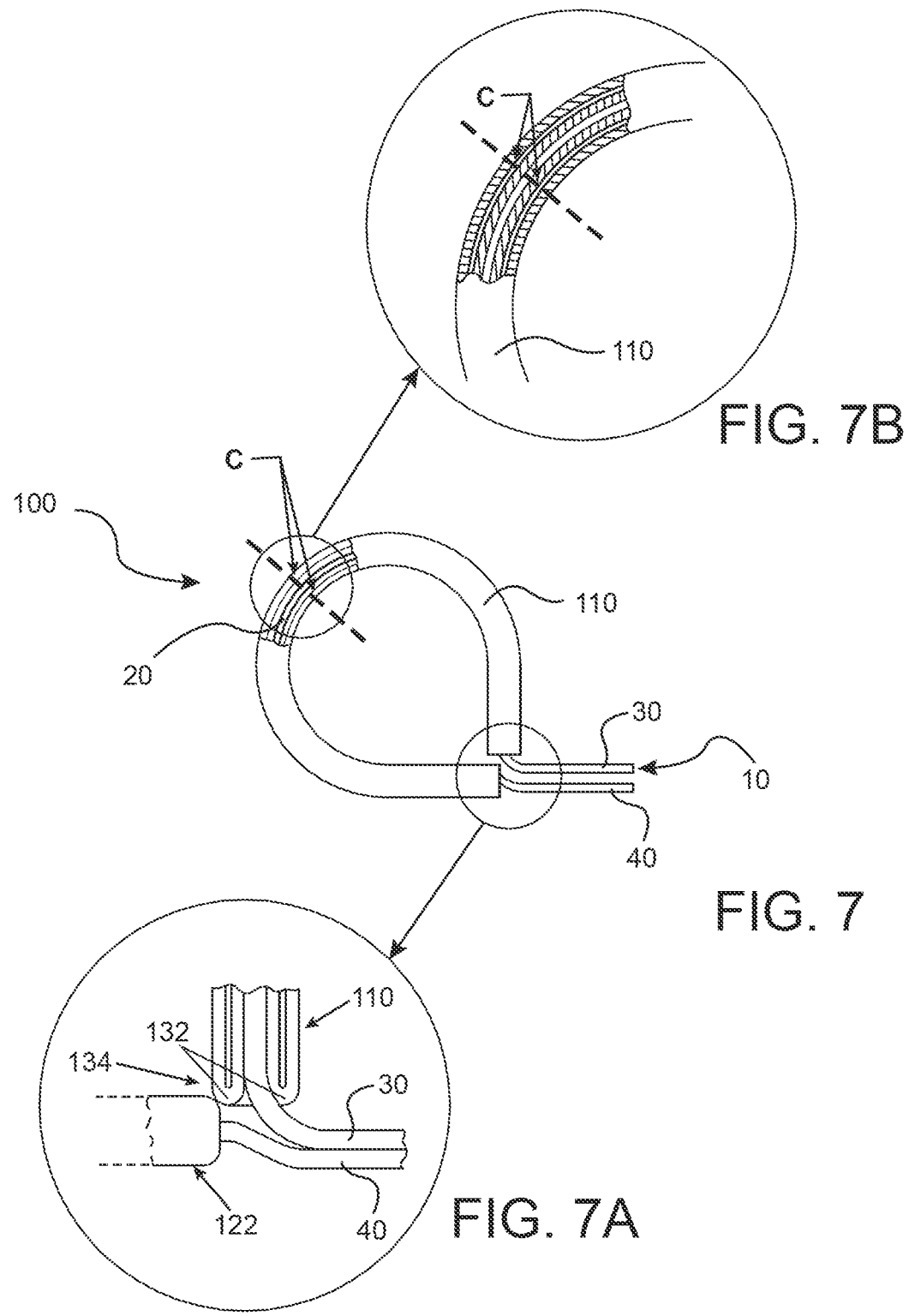

FIGS. 7, 7A and 7B illustrate various aspects of a completed cushioned clamp assembly 100 prepared in accordance with the above process. As shown in FIG. 7, the looped center section 20 of the bare metal loop clamp 10 may be substantially encompassed by the sleeve 110 such that, as shown in the enlarged view of FIG. 7A, when the foot section 30 and the tail section 40 of the bare metal loop clamp 10 are secured together into a closed position, the sleeve 110 may substantially or completely enclose in a cushioned fashion a supported structure, such as a wire, wire harness assembly, or the like. As shown in the enlarged, partial cutaway view of FIG. 7A, the first rolled end 122 may abut 134 the second rolled end 132 to reduce or eliminate any gap. Moreover, as illustrated more particularly in FIG. 7B, the cut ends 120 and 130 that have been rolled in toward the interior portion of the sleeve 110 to meet at or substantially near the center C of the sleeve 110. In this manner, the cut ends 120 and 130 are protected from any abrasive wear against the supported structure.

Figure 8:
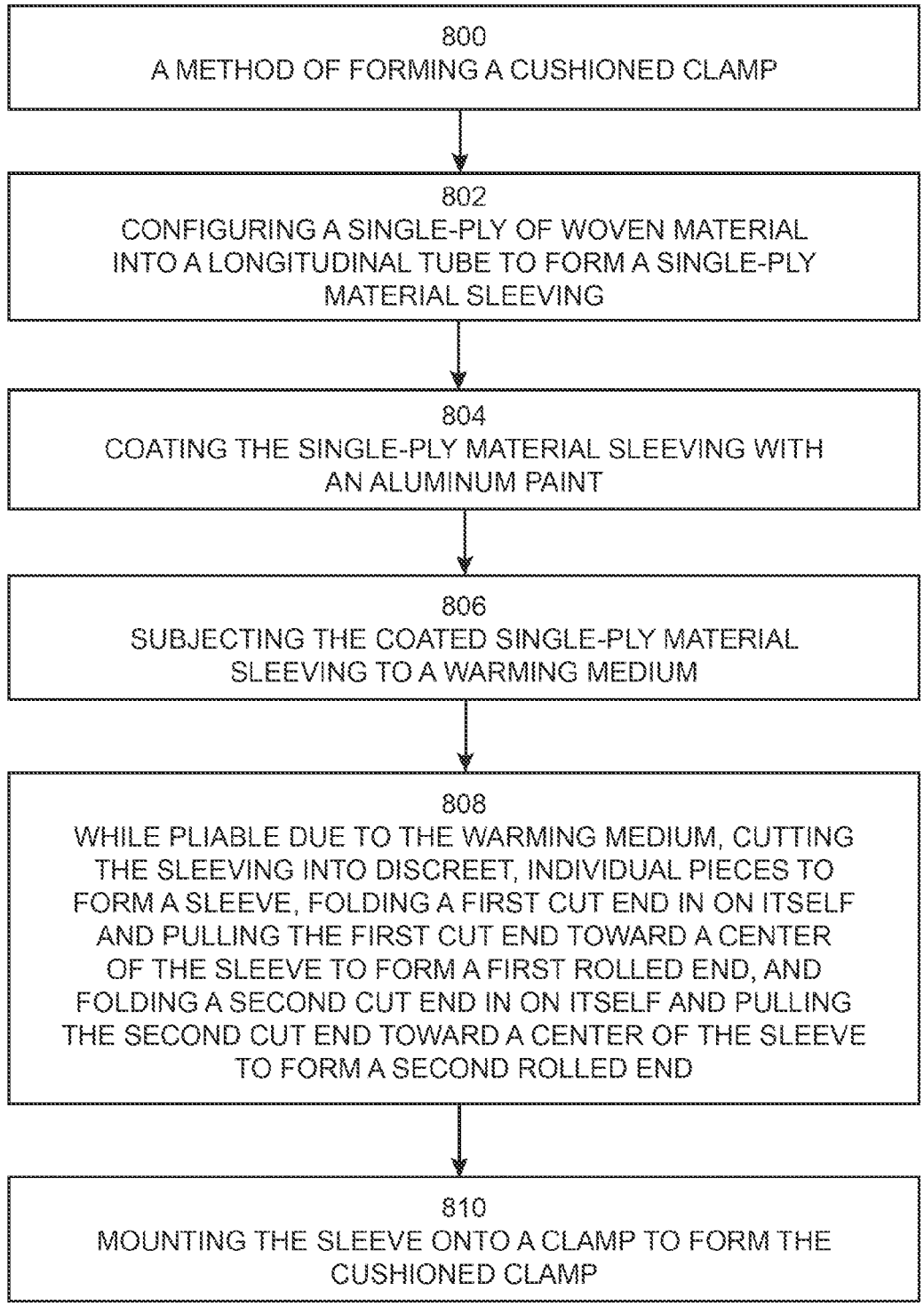
FIG. 8 illustrates a process of forming a cushioned sleeve assembly in accordance with aspects of the present disclosure.

FIG. 8 illustrates a process of forming a cushioned sleeve assembly in accordance with aspects of the present disclosure. In particular, FIG. 8 illustrates an exemplary process 800 for forming a cushioned clamp. In box 802, a single-ply of woven fiberglass may be configured into a longitudinal tube to form a single-ply fiberglass sleeving. Thereafter, in box 804, the single-ply fiberglass sleeving may be coated with a paint. In box 806, the coated single-ply fiberglass sleeving may be subjected to a warming medium. As shown in box 808, while pliable due to the warming medium, the sleeving may be cut into discreet, individual pieces configured for forming a sleeve. This may include folding a first cut end in on itself and pulling the first cut end toward a center of the sleeve to form a first rolled end, and folding a second cut end in on itself and pulling the second cut end toward a center of the sleeve to form a second rolled end. Next, as shown in box 810, the sleeve may be slidably mounted onto a bare metal clamp to form the cushioned clamp.

In another aspect of the disclosure, a process of forming a cushioned sleeve assembly may include the following: cut fiberglass sleeve into 3-foot long (approximate) sections using a shear scissor. Remove and discard the black plastic core (if included with the fiberglass sleeve). Separate the inner and outer fiberglass sleeves (take care not to fray the ends excessively). Soak the inner and outer fiberglass sleeves in tap water for approximately 1 minute. Remove the inner and outer fiberglass sleeves from water and soak up the excess water using a towel or the like. Cut the fiberglass sleeve to length as required by a router using the cushion cutter. Soak the recently-cut cushions in hot (not boiling) water for 5 minutes minimum. Remove the cushions from water and soak up the excess water using a towel or the like. Fold one cushion end outside in. Use a needle nose plier to pull the "tucked" end toward the mid-section of the cushion. Measure the cushion length as it should now be around ¾ the cut length. The needle nose plier may be a Hemostat Pean Clamp (10" straight stainless forceps). Repeat same process for other end. Pull the cushion end toward the middle to touch the opposite sleeve end. The ends inside the sleeve should not overlap. Optionally, during manufacturing one can squeeze the cushion on the outside in several locations, to check to ensure the cushion ends touch but di not overlap. Moreover, during manufacturing no thin spots or bulges should be allowed. Before installing onto the metal clamp, dry the cushion in ambient condition for 8 hours minimum or oven dry for 1 hour±15 minutes at 200° F.±20° F. Finally, when installing the cushion on the metal clamp, one should take care not to have the metal clamp catch the inner tucked portion of the cushion. This may cause excessive fraying, bulging and/or thinning on the inside.

As described herein, the disclosure provides a cushioned clamp used to dampen vibration, reduce noise, and reduce wear on the features supported by the clamps. The disclosed cushioned clamp is less susceptible to fraying or separation. Moreover, the disclosed cushioned clamp is less likely to be a source of wear on a supported feature. Furthermore, the disclosed cushioned clamp is less likely to generate an electrical short.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A process of forming a cushioned clamp comprising:
providing a metal loop clamp having opposing first and second free ends and a looped center section between the opposing two free ends;
configuring a single-ply of woven material into a longitudinal tube to form a single-ply woven material sleeve having a single-ply configuration with a first cut end and a second cut end;
folding the first cut end in on itself and pulling the first cut end toward a center of the single-ply woven material sleeve to form a first rolled end of the sleeve;
folding the second cut end in on itself and pulling the second cut end toward the center of the single-ply woven material sleeve to form a second rolled end of the sleeve to form the sleeve into a two-ply configuration; and
slidably mounting the sleeve in the two-ply configuration onto the looped centered section to form the cushioned clamp.

2. The process of forming a cushioned clamp according to claim 1 further comprising coating the single-ply woven material sleeve in the single-ply configuration with a paint to form the sleeve in a coated single-ply configuration.

3. The process of forming a cushioned clamp according to claim 2, wherein the paint comprises an aluminum paint.

4. The process of forming a cushioned clamp according to claim 2, further comprising subjecting the sleeve in the coated single-ply configuration to a warming medium; and
cutting the single-ply woven material sleeve into discreet, individual pieces.

5. The process of forming a cushioned clamp according to claim 1 wherein the woven material comprises woven fiberglass.

6. The process of forming a cushioned clamp according to claim 1 wherein the metal loop clamp comprises a bare metal loop clamp.

7. The process of forming a cushioned clamp according to claim 1 wherein each of said opposing first and second free ends of said metal loop clamp comprises an aperture configured to receive a mechanical fastener.

8. The process of forming a cushioned clamp according to claim 1 wherein the first free end of the metal loop clamp comprises a foot section having an aperture configured to receive a mechanical fastener, and the second free end of the metal loop clamp comprises a tail section having an aperture configured to receive the mechanical fastener.

9. A cushioned clamp comprising:
a metal loop clamp having opposing first and second free ends and a looped center section between the opposing two free ends;
a single-ply of woven material arranged in a longitudinal tube to form a single-ply woven material sleeve having a single-ply configuration with a first cut end and a second cut end, the first cut end being folded in on itself extending toward a center of the single-ply woven material sleeve to form a first rolled end, and the second cut end being folded in on itself extending toward the center of the single-ply woven material sleeve to form a second rolled end; and
the single-ply woven material sleeve being disposed on the looped center section between the opposing two free ends of the metal loop clamp, wherein the looped center section is configured to support a supported feature.

10. The cushioned clamp according to claim 9 further comprising a paint coating arranged on the single-ply woven material sleeve in the single-ply configuration of the sleeve.

11. The cushioned clamp according to claim 10, wherein the paint coating comprises an aluminum paint coating.

12. The cushioned clamp according to claim 9 wherein the woven material comprises woven fiberglass.

13. The a cushioned clamp according to claim 9 wherein the metal loop clamp comprises a bare metal clamp.

14. The cushioned clamp according to claim 9 wherein each of said opposing first and second free ends of said metal loop clamp comprises an aperture configured to receive a mechanical fastener.

15. The cushioned clamp according to claim 9 wherein the first free end of the metal loop clamp comprises a foot section having an aperture for receiving a mechanical fastener and the second free end of the metal loop clamp comprises a tail section having an aperture for receiving the mechanical fastener.

16. A process of forming a cushioned clamp comprising:
providing a metal loop clamp having opposing first and second free ends and a looped center section between the opposing first and second free ends, each of said opposing first and second free ends of said metal loop clamp including an aperture configured to receive a mechanical fastener;
configuring a single-ply of woven material into a longitudinal tube to form a single-ply woven material sleeve;
coating the single-ply woven material sleeve with a paint;
subjecting the coated single-ply fiberglass sleeve to a warming medium;
cutting the single-ply woven material sleeve to form a single-ply woven material sleeve having a single-ply configuration with a first cut end and a second cut end;
folding the first cut end in on itself and pulling the first cut end toward a center of the sleeve to form a first rolled end of the sleeve;
folding the second cut end in on itself and pulling the second cut end toward the center of the sleeve to form a second rolled end of the sleeve to form the sleeve into a two-ply configuration; and
slidably mounting the sleeve in the two-ply configuration onto the looped center section to form the cushioned clamp.

17. The process of forming a cushioned clamp according to claim 16 wherein the paint comprises an aluminum paint.

18. The process of forming a cushioned clamp according to claim 16 wherein the woven material comprises woven fiberglass.

19. The process of forming a cushioned clamp according to claim 16 wherein the metal loop clamp comprises a bare metal loop clamp.

* * * * *